Patented Oct. 4, 1927.

1,644,418

UNITED STATES PATENT OFFICE.

JOSEPH G. DAVIDSON, OF YONKERS, NEW YORK, ASSIGNOR TO CARBIDE AND CARBON CHEMICALS CORPORATION, A CORPORATION OF NEW YORK.

SOLUTION OF CELLULOSE ESTERS.

No Drawing.   Application filed July 20, 1925. Serial No. 44,928.

The invention relates to solutions of cellulose esters such as are employed, for example, as lacquers, lacquer enamels, and dopes for airplane fabrics; and its object is to provide improved compositions of this class.

Many solvents for cellulose esters, such as the nitrate and acetate esters, are known. Butyl and amyl acetates are often used; and acetylene tetrachlorid, ethylene chlorhydrin, and diacetone alcohol, $$CH_3COCH_2COH(CH_3)_2,$$

may also be mentioned. There are many others.

As compared with known solvents for cellulose esters, the ethers of propylene glycol exhibit certain advantageous properties. These ethers and processes for preparing them are described in an application filed by me simultaneously herewith, Serial No. 44,929. They have the general formula

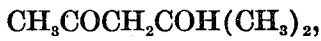

where R stands for an alkyl or aryl group, or a hydrogen atom, and R' stands for an alkyl or aryl group. The di-ethers are distinguished from the acetals of the same empirical formula by having the ether linkages on different carbon atoms. The structural formulas are not certainly known, but it is believed that the mono-ethers are chiefly or solely of the type

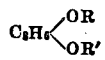

Examples of the ethers of propylene glycol are the monomethyl ether $C_3H_6OH.OCH_3$ (b. p. 122.8° C.), the monoethyl ether $C_3H_6OH.OC_2H_5$ (b. p. 133.0° C.), the mono isopropyl ether (b. p. 141.5° C.), the mono normal propyl ether (b. p. 150.0° C.), the mono isobutyl ether (b. p. 161.3° C.), the mono normal butyl ether (b. p. 170.6° C.), the mono isoamyl ether (b. p. 183.3° C.), the dimethyl ether $C_3H_6(OCH_3)_2$, and the di-ethyl ether. The above boiling points are at 736 mm. pressure. The aryl ethers, e. g. the monophenyl ether $C_3H_6OH.OC_6H_5$ and the monobenzyl ether $C_3H_6OH.OCH_2C_6H_5$, are also good solvents for cellulose esters.

When used for dissolving cellulose esters, the ethers of propylene glycol have the advantage of high solvent power; freedom from disagreeable odors such as characterize butyl and amyl acetates; ability to form free-flowing solutions; and miscibility with most of the common and cheap solvents. They contain no acid radicle and therefore do not hydrolyze. The mono-ethers surpass the di-ethers in solvent power.

The propylene glycol ethers may be used in conjunction with a wide variety of other solvents or diluents in the preparation of lacquers and the like. Because of their high solvent power a large proportion of cheap diluent, such as gasoline or benzene, may often be used. A high-boiling solvent, such as is commonly used in small proportion in conjunction with known solvents for cellulose esters, may also be used in conjunction with the propylene glycol ethers, and other expedients employed in the lacquer industry are likewise applicable in general where the glycol ethers are employed.

Instead of a pure or nearly pure propylene glycol ether, I may use a mixture, such as a mixture of mono- and di-ethers with the same or different ether groups. Mixtures containing the ethers of propylene glycol together with one or more ethers of another glycol or glycols, e. g. the ethylene and butylene glycols, are also valuable solvents for cellulose esters. Such mixtures can be prepared by working up a raw material which is itself a mixture. For example, a mixture of olefin oxids can be prepared by appropriate steps from a mixture of olefins and the olefine oxides can be used for making ethers by causing them to react with alcohols in the manner more fully described in my application Serial No. 44,929.

I claim:

1. A composition of matter comprising a solution of cellulose ester containing a substantial proportion of an ether of propylene glycol.

2. A composition of matter comprising a solution of cellulose ester containing a substantial proportion of an alkyl ether of propylene glycol.

3. A composition of matter comprising a solution of cellulose ester containing a substantial proportion of a mono-ether of propylene glycol.

4. A composition of matter comprising a solution of cellulose ester containing a substantial proportion of a monoalkyl ether of propylene glycol.

5. A composition of matter comprising a solution of cellulose ester containing a substantial quantity of a propylene glycol ether represented by the formula $$C_3H_6\!\!<\!\!{}^{OH}_{OR}$$

where R is a methyl or ethyl group.

6. A composition of matter comprising a solution of cellulose ester containing a substantial proportion of an ethyl ether of propylene glycol.

7. A composition of matter comprising a solution of cellulose ester containing a substantial proportion of a monoethyl ether of a propylene glycol.

In testimony whereof, I affix my signature.

JOSEPH G. DAVIDSON.